(12) United States Patent
Lee et al.

(10) Patent No.: US 7,630,594 B2
(45) Date of Patent: Dec. 8, 2009

(54) OPTICAL INTERCONNECTION MODULE

(75) Inventors: Chun-Hsing Lee, Hsinchu (TW); Shin-Ge Lee, Hsinchu (TW); Ying-Chih Chen, Hsinchu (TW); Cherng-Shiun Wu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/878,114

(22) Filed: Jul. 20, 2007

(65) Prior Publication Data
US 2008/0085076 A1 Apr. 10, 2008

(30) Foreign Application Priority Data
Oct. 4, 2006 (TW) .............................. 95136965 A (51) Int. Cl.
G02B 6/12 (2006.01)
G02B 6/26 (2006.01)
G02B 6/42 (2006.01)

(52) U.S. Cl. ......................................... 385/14; 385/52

(58) Field of Classification Search .................. 385/14, 385/49, 52, 88, 89, 91, 93
See application file for complete search history.

(56) References Cited

U.S. PATENT DOCUMENTS

| 6,512,861 | B2 | 1/2003 | Chakravorty et al. | |
| 6,516,104 | B1 * | 2/2003 | Furuyama | 385/14 |
| 6,599,031 | B2 | 7/2003 | Li | |
| 6,792,179 | B2 * | 9/2004 | Lu et al. | 385/33 |
| 7,058,247 | B2 | 6/2006 | Crow et al. | |
| 7,062,144 | B2 * | 6/2006 | Hwang et al. | 385/139 |
| 7,149,376 | B2 * | 12/2006 | Uchida et al. | 385/15 |
| 7,233,723 | B2 * | 6/2007 | Williams et al. | 385/33 |
| 7,239,767 | B2 * | 7/2007 | Kim et al. | 385/14 |

FOREIGN PATENT DOCUMENTS

| TW | 1240097 | 9/2005 |
| TW | 1242938 | 11/2005 |

* cited by examiner

*Primary Examiner*—Daniel Petkovsek
(74) *Attorney, Agent, or Firm*—Birch, Stewart, Kolasch & Birch, LLP (57) ABSTRACT

An optical interconnection module includes at least one optoelectronic element, at least one substrate, and at least one optical coupling element. A plurality of matching elements is formed on one side of the optical coupling element opposite to the optoelectronic element and the substrate. A plurality of alignment elements is formed in the optoelectronic element and the substrate at positions corresponding to the matching elements. The matching elements and alignment elements are engaged with each other for alignment, such that the optoelectronic element, the substrate and the optical coupling element are directly aligned during assembly. Moreover, the optical coupling element is used to increase the optical coupling efficiency of the optoelectronic element and an optical waveguide formed on the substrate.

17 Claims, 7 Drawing Sheets

OPTICAL INTERCONNECTION MODULE

CROSS-REFERENCE TO RELATED APPLICATIONS

This non-provisional application claims priority under 35 U.S.C. § 119(a) on Patent Application No(s). 095136965 filed in Taiwan, R.O.C. on Oct. 4, 2006, the entire contents of which are hereby incorporated by reference.

BACKGROUND OF THE INVENTION

1. Field of Invention

The present invention relates to an optical interconnection module. More particularly, the present invention relates to an optical interconnection module capable of quickly aligning and improving the optical coupling efficiency.

2. Related Art

Along with the progress in optical communication element technology, the system develops toward having broadband and high speed, and the packaging technology must meet the requirements of light, thin, short and small, easy packaging, low cost and high reliability. Due to the development of the Internet, people's demand on the bandwidth of the network is continuously increased, and the optical network gradually develops toward having a large volume, lots of variations, high reliability, and being economical and effective. The optical communication is no longer limited to the remote communication. From the backbone network, metropolitan area network, access network, the optical networking is realized step by step, and the fiber to home is gradually formed. In order to achieve the high speed and popularization of the optical communication, it is necessary to set up an optoelectronic packaging technology of low cost, so as to develop low cost optical communication elements and high speed transceiver modules, which is the focus of the progressing optical interconnection technology. Since the Internet completely adopts optical fiber transmission, the signal transmission in the future high performance computer develops toward parallel optical interconnect. An optical method is used to connect the computer chip, module, circuit board, base plate, case and processor, so as to transmit a signal in the manner of high speed photon, thus solving the bottleneck problems in the conventional electronic transmission, such as heat, speed, limited bandwidth. Along with the rise of the processing speed of CPU or other chips in a computer, the requirement of using optical communication to transmit data is gradually increased. It is foreseeable that when the computer is integrated with the optical communication technology, the optical interconnect and optical data communication may bring great impacts on the industry and technology.

Therefore, in a technology relative to the optical interconnection, for example, U.S. Pat. No. 7,058,247, an index matching layer is disposed on one side of an optical interconnect module facing a circuit board. The alignment mechanism has the following options: one is disposing a bump on the index matching layer and an opening at the position corresponding to the circuit board, which is used for alignment when the optical interconnect module is assembled on the circuit board; or, an opening is disposed in the index matching layer, and a bump is disposed on the circuit board; or, an opening penetrating the electrode portion of the optical interconnect module is disposed in the index matching layer, a solder ball is embedded in the circuit board, and by inserting the solder ball into the opening to contact the electrode, the optical interconnect module and the circuit board can be fixed by welding. However, in the U.S. Pat. No. 7,058,247, an index matching layer is added into the optical interconnect module, and thus an additional process is needed.

Further, in U.S. Pat. No. 6,599,031, as for the configuration, an optical receiver and an optical transmitter are disposed in a depressed portion of the package; next, a layer of transparent polymer is covered on the depressed portion for sealing and light transmission; and then, microlens arrays are formed on the transparent polymer. Similarly, a depressed portion is formed in the optoelectronic substrate, a layer of transparent polymer is filled into the depressed portion, and microlens arrays corresponding to those of the package are connected onto the polymer. As the surface of the polymer must be polished before connecting the microlens arrays, the process is complicated, and it is difficult to integrate the polymer with the package and optoelectronic substrate. Moreover, as the lenses are independently fabricated on the package and the optoelectronic substrate, the fabricating cost is high.

Further, in U.S. Pat. No. 6,512,861, the alignment is fulfilled in two steps. Firstly, two alignment balls are disposed on one side of a chip of ball grid array (BGA) package, and V-grooves are disposed in the circuit board corresponding to the alignment balls. The alignment balls are engaged with the V-grooves to approximately align the chip and the circuit board, such that an optical transceiving element disposed on the chip can be coupled to an optical waveguide of the circuit board. Next, the solder ball disposed on one side of the chip is directly aligned with the pad area on the circuit board, thus fulfilling the alignment and position. Therefore, in the U.S. Pat. No. 6,512,861, as for the first alignment mechanism, the alignment balls and V-grooves must be re-arranged, and thus, an additional process is needed. Finally, the solder ball is positioned in the pad area to fulfill the alignment and fixing. However, as the processing accuracy of welding the solder ball to the pad area is not high, slight shift may occur, thus affecting the accuracy of the alignment.

SUMMARY OF THE INVENTION

Accordingly, the present invention provides an optical interconnection module, so as to make the alignment between the optoelectronic element and the substrate accurately, and to reduce the quantity of used elements as well as the additional process.

Therefore, in order to solve the technical problems in the above-mentioned optical interconnection module, the present invention provides an optical interconnection module for transmitting an optical signal. The optical interconnection module comprises at least one optoelectronic element, at least one substrate, and at least one optical coupling element, wherein the optoelectronic element has an optical transmission port for transmitting the optical signal and at least one first alignment element adjacent to the optical transmission port. The substrate has an optical waveguide, at least one port (also referred to as an opening) disposed on the surface of the substrate and connected to the optical waveguide, and at least one second alignment element adjacent to the port (opening), such that the optical signal is transmitted between the port (opening) and the optical waveguide. The optical coupling element comprises an optical transmitting portion corresponding to the optical transmission port and the port (opening), at least one first matching element corresponding to the first alignment element, and at least one second matching element corresponding to the second alignment element. The first matching element is engaged with the first alignment element, and the second matching element is engaged with the second alignment element, so as to make the optical transmitting portion directly align with the optical transmission port and the port (opening), and to fix the relative position of the optical transmitting portion, the optical transmission port and the port (opening), such that the optical signal can be transmitted among the optical transmission port, the optical transmitting portion, the port (opening), and the optical waveguide.

The engagement between the first matching element and the first alignment element and the engagement between the second matching element and the second alignment element may be in the configuration of a protruded and a depressed shape. Moreover, the protruded length can be made larger than the depressed depth, so as to form a space among the optical transmitting portion, the optical transmission port, and the port, thereby improving the optical coupling efficiency among the optical transmitting portion, the optical transmission port, and the port. The first matching element and the second matching element may be disposed at corresponding positions or at the staggered positions. When the substrate or optoelectronic element is to be replaced, the corresponding optical coupling element may be designed for completely matching to achieve the same optical coupling efficiency.

The optical coupling element of the present invention may be an injection molded element, wherein the optical transmitting portion, the first matching element, and the second matching element are directly formed, and the first alignment element of the optoelectronic element and the second alignment element of the substrate should only be directly formed in the final surface process. Therefore, in the optical interconnection module of the present invention, no additional process is required to fabricate the alignment element, and the same purpose can be achieved by directly forming the alignment mechanism on the element, so the assembly is quick and accurate. Furthermore, the optical coupling efficiency of the optical transmission port of the optoelectronic element and the port of the substrate can be improved through the optical coupling element.

The features and practice of the preferred embodiments of the present invention will be illustrated in detail below with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
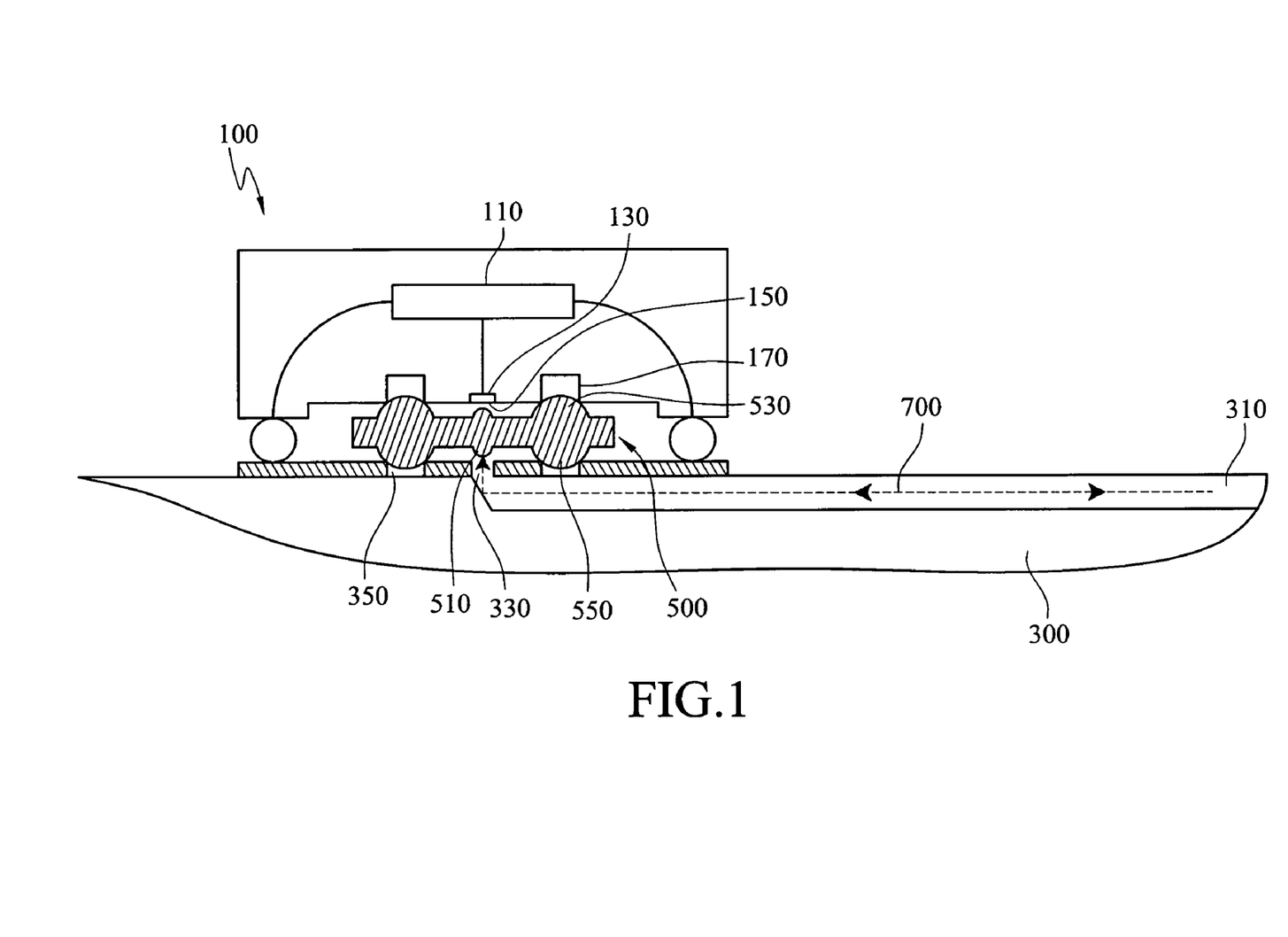
FIG. 1 is schematic combination view of the present invention.

Referring to FIG. 1, a schematic combination view of the present invention is shown. The present invention is an optical interconnection module used for optoelectronic element to optoelectronic element, for example transmitter chip to receiver chip, or optoelectronic element to the substrate which uses an optical signal as a message passing media, for example transmitter chip to optical waveguide substrate, for preventing electromagnetic wave interference and improving transmitting speed. As shown in FIG. 1, the optical interconnection module includes at least one optoelectronic element 100, at least one substrate 300, and at least one optical coupling element 500, wherein the optoelectronic element 100 has a driving chip 110, an optical source 130, an optical transmission port 150, used to transmit an optical signal 700, at least one first alignment element 170 adjacent to the optical transmission port 150. The driving chip 110 drives the optical source 130 to generate the optical signal 700, and the optical signal 700 is transmitted to the outside via the optical transmission port 150. Definitely, the optoelectronic element can also use an optical sensor instead of the optical source, or has dual-channel optical source and optical sensor, which is used to generate the optical signal and receive the optical signal. In this embodiment, only the optical source 130 is used for illustration. The substrate 300 has an optical, waveguide 310, at least one port (also referred to as an opening) 330 disposed on the surface of the substrate 300 and connected to the optical waveguide 310, and at least one second alignment element 350 adjacent to the port 330. The optical waveguide 310 is used to transmit the optical signal 700, and the port 330 is one end of the optical waveguide used for making optical signal 70P irradiated into the optical waveguide via the port 330. The optical coupling element 500 includes an optical transmitting portion 510 corresponding to the optical transmission port 150 and port 330, at least one first matching element 530 corresponding to the first alignment element 170, and at least one second matching element 550 corresponding to, the second alignment element 350. The first matching element 530 is engaged with the first alignment element 170, and the second matching element 550 is engaged with the second alignment element 350, so that the optical transmitting portion 510 is directly aligned with the optical transmission port 150 and the port 330, and the relative position of the optical transmitting portion 510, the optical transmission port 150, and the port 330 are fixed, and thus the optical signal 700 can be transmitted among the optical transmission port 150, the optical transmitting portion 510, the port 330, and the optical waveguide 310. In this embodiment, the optoelectronic element 100 is electrically connected to the substrate 300 through BGA soldering, or Pin Grid Array (PGA), so as to transmit the electrical signal and the power supply. The optical transmitting portion 510 is protruded from the two sides of the optical coupling element 500 to form a double-convex lens, such that the optical signal is focused via the lens to increase the optical coupling efficiency. However, the driving chip 110 can be a package formed in the optoelectronic element 100, and can also be electrically connected to a connection substrate. The connection substrate has an optical receiving element or an optical transceiving element.

Figure 2A:
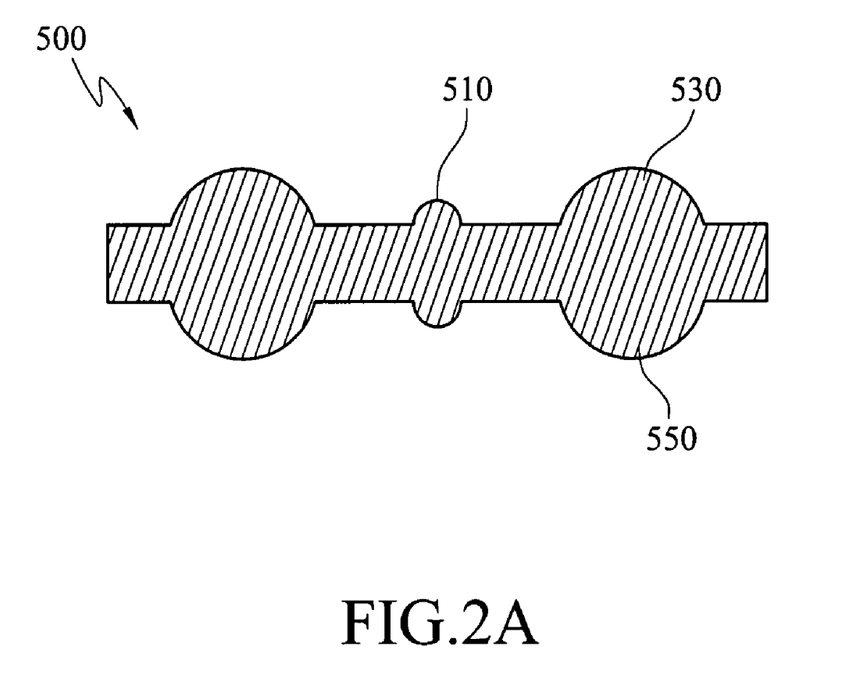
FIG. 2A is a schematic cross-sectional view of a sheet-type optical coupling element of the present invention.
Figure 2B:
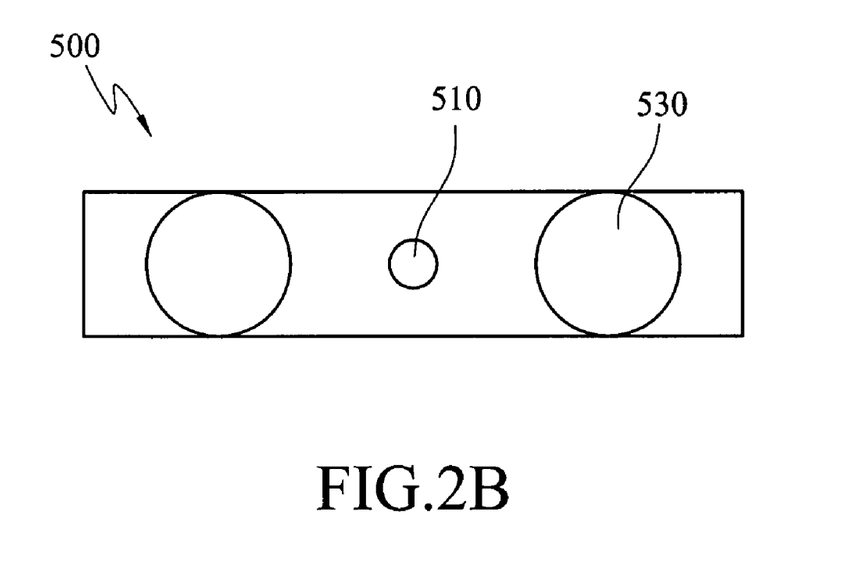
FIG. 2B is a schematic top view of a sheet-type optical coupling element of the present invention.
Figure 3A:
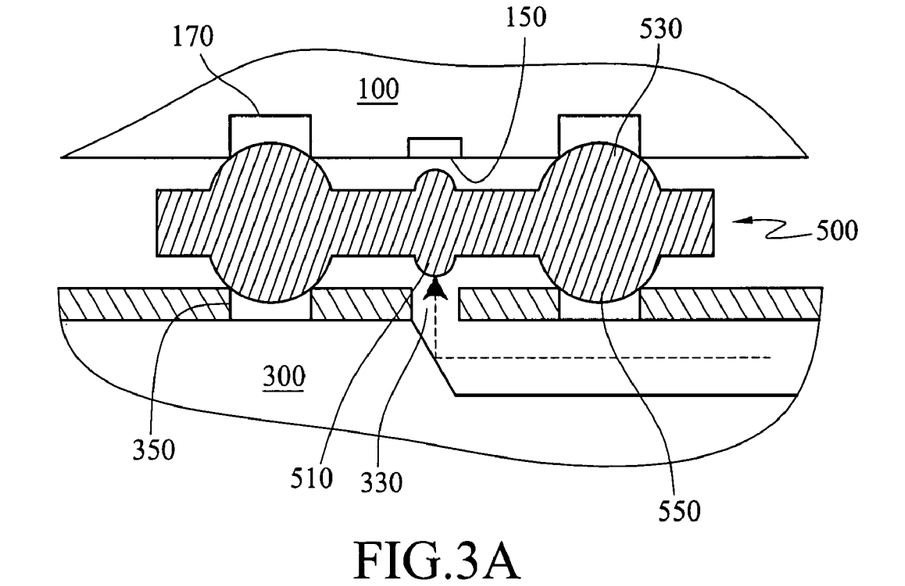
FIG. 3A is a schematic cross-sectional view of a disc-type optical coupling element of the present invention.
Figure 3B:
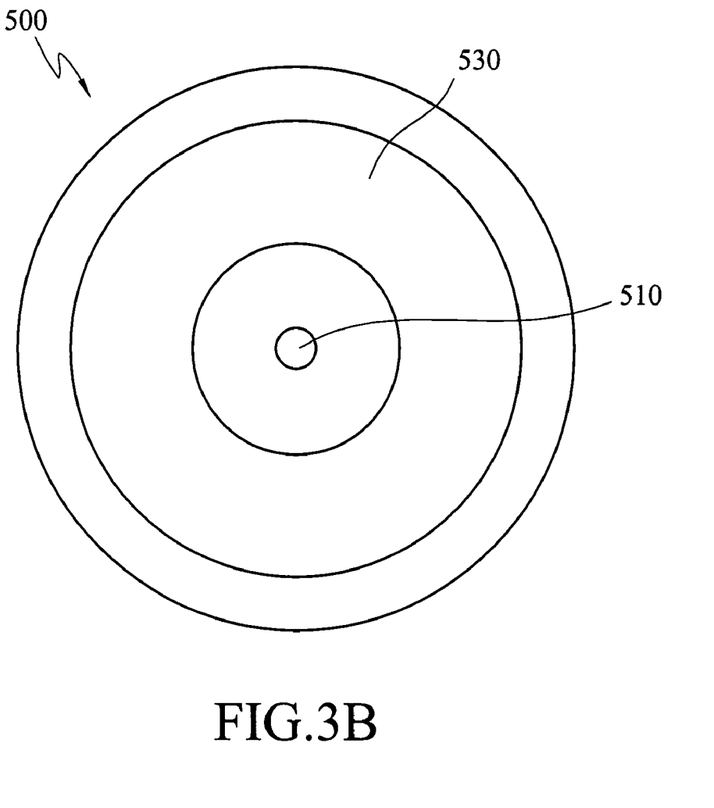
FIG. 3B is a schematic top view of a disc-type optical coupling element of the present invention.

Referring to FIGS. 2A, 2B, 3A and 3B, a schematic cross-sectional view and a schematic top view of a sheet-type optical coupling element and a schematic cross-sectional view and a schematic top view of a disc-type optical coupling element of the present invention are shown. As shown in FIGS. 2A and 2B, the optical coupling element 500 is a sheet-type optical coupling element. As shown in FIGS. 3A and 3B, the optical coupling element 500 is a disc-type optical coupling element, the first matching element 530 is a closed circular curve, and the second matching element 550 is also a closed circular curve. In this manner, when the optical coupling element 500 is assembled with the optoelectronic element 100 and the substrate 300, the first matching element 530 and the second matching element 550 are correspondingly engaged with the first alignment element 170 and the second alignment element 350 respectively, and the first alignment element 170 and the second alignment element 350 and the first matching element 530 and the second matching element 550 are of the corresponding shapes, so as to engage with each other. In this manner, the optical transmission port 150 and the optical transmitting portion 510 are closed by the optical coupling element 500, and the port 330 and the optical transmitting portion 510 are closed, so as to prevent foreign matter from blocking the transmitting of the optical signal 700. In addition, the first matching element 530 and the second matching element 550 of the optical coupling element 500 can be arranged in matrix or a plurality of elements, so as to achieve a stable alignment structure.

Figure 4A:
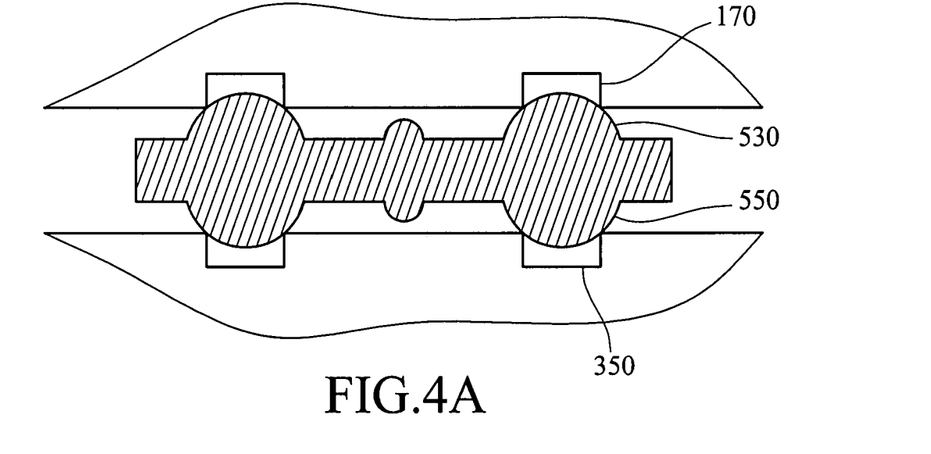
FIGS. 4A, 4B, and 4C are schematic views of the first matching element, the second matching element, the first alignment element, and the second alignment element according to different embodiments of the present invention.
Figure 4B:
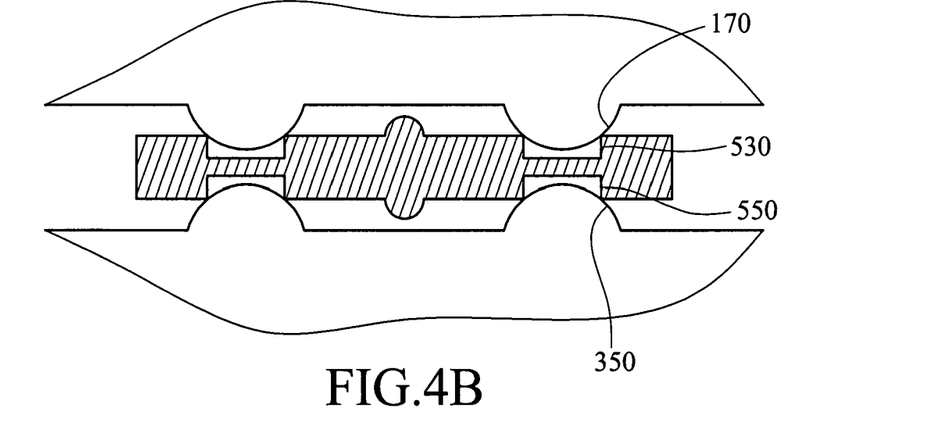
Figure 4C:
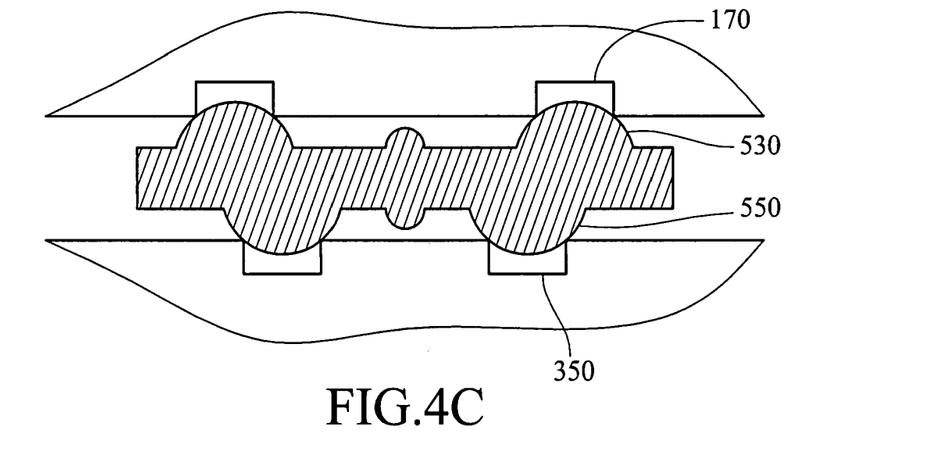

Referring to FIGS. 4A, 4B and 4C, schematic views of the first matching element, the second matching element, the first alignment element, and the second alignment element according to different embodiments of the present invention are shown. As shown in FIG. 4A, the first matching element 530 is of a protruded shape, and the first alignment element 170 is of a depressed shape, so that the first matching element 530 is engaged with the first alignment element 170. The second matching element 550 is of a protruded shape, and the second alignment element 350 is of a depressed shape, so that the second matching element 550 is engaged with the second alignment element 350. As shown in FIG. 4B, the first matching element 530 is of a depressed shape, and the first alignment element 170 is of a protruded shape, so that the first alignment element 170 is engaged with the first matching element 530. The second matching element 550 is of a depressed shape, and the second alignment element 350 is of a protruded shape, so that the second alignment element 350 is engaged with the second matching element 550. For the above embodiment, the position of the first matching element 530 is corresponding to the position of the second matching element 550. As shown in FIG. 4C, the positions of the first matching element 530 and the second matching element 550 are staggered, and are disposed according to the positions of the first alignment element 170 and the second alignment element 350. The protruded shape in the above embodiment is mostly an arc protruded shape, and the matched depressed shape is mostly a square depressed shape. With this combination, the matching of the protruded shape and the depressed shape are featured by automatic central alignment. Even if the tolerance of the protruded shape and the depressed shape is relatively large, the centers can be aligned, so as to eliminate the misalignment of the centers caused by transversal displacement.

Figure 5A:
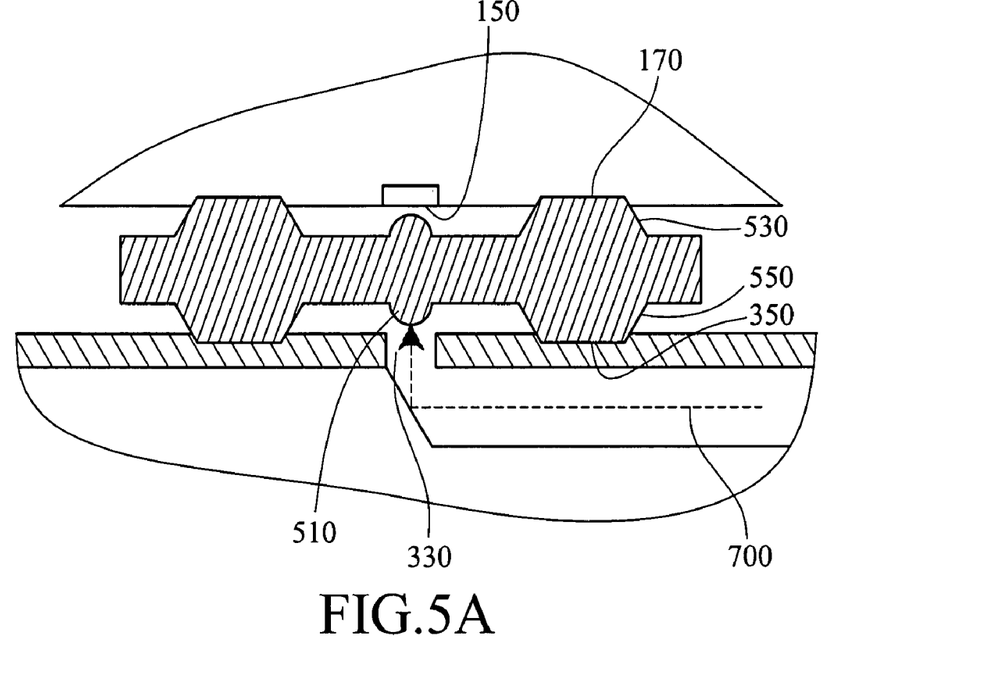
FIGS. 5A, 5B, and 6 are schematic views of the close engagement of the first matching element, the second matching element, the first alignment element, and the second alignment element of the present invention.
Figure 5B:
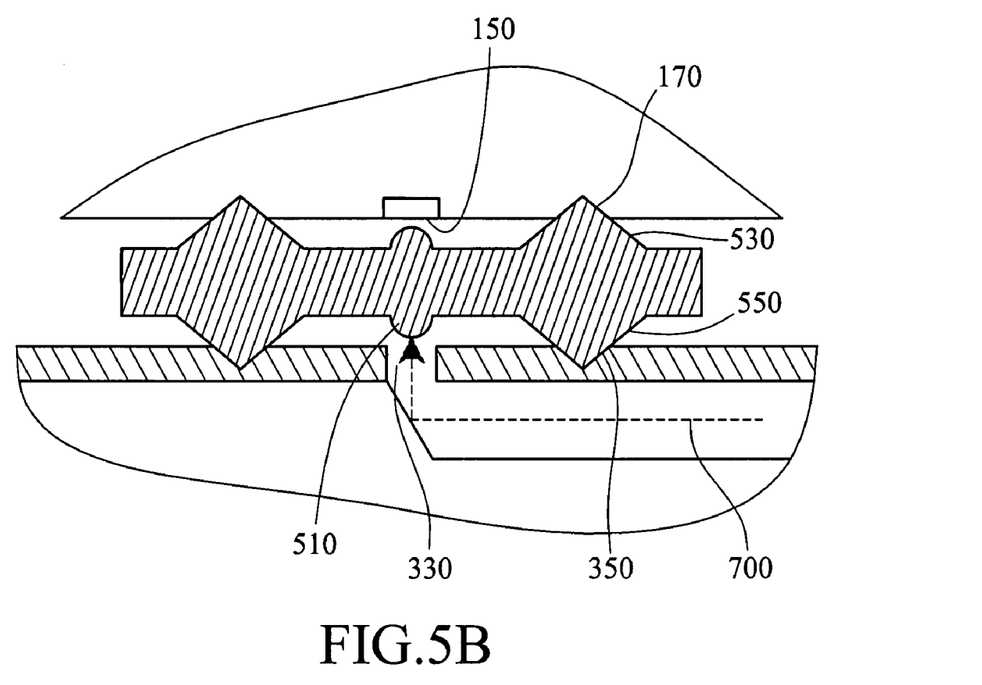
Figure 6:
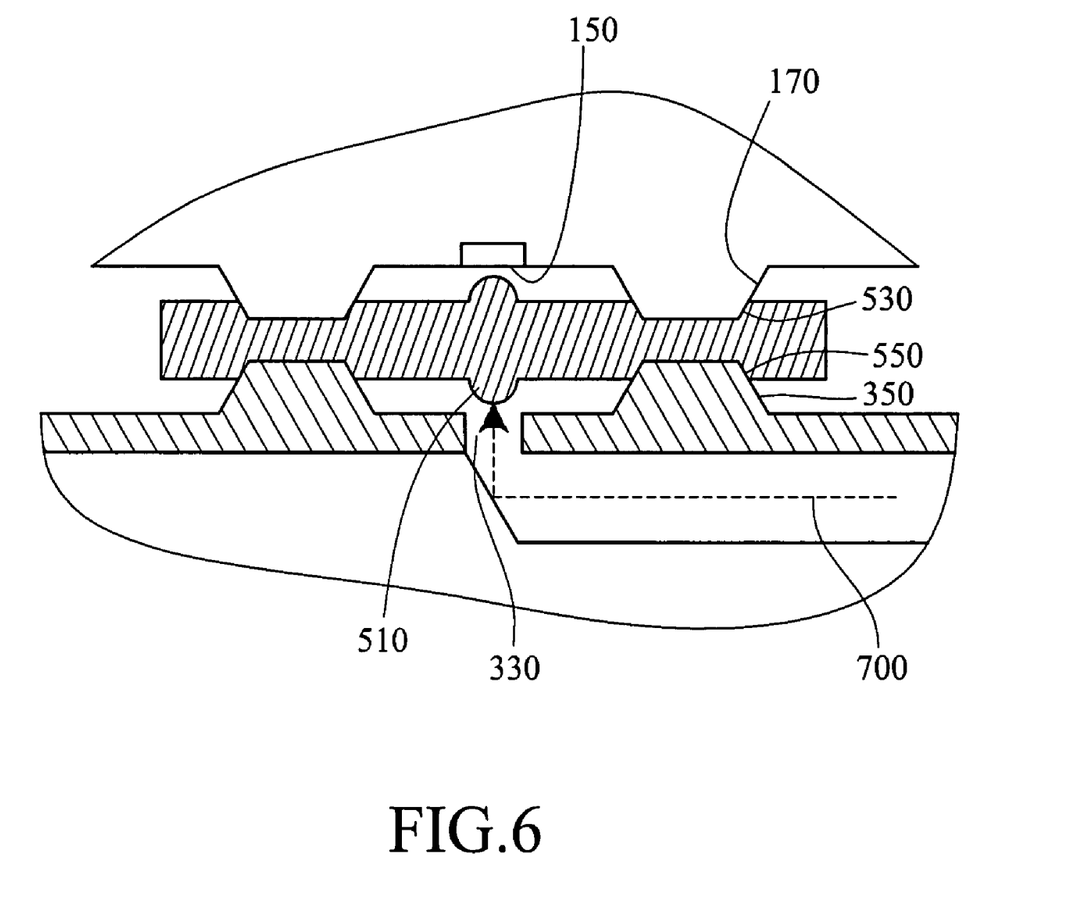

Referring to FIGS. 5A, 5B, and 6, schematic views of the close engagement of the first matching element, the second matching element, the first alignment element, and the second alignment, element of the present invention are shown. The shape of the first matching element accords with the shape of the first alignment element and is closely engaged with the shape of the first alignment element, and the shape of the second matching element accords with and can be closely engaged with the shape of the second alignment element. As shown in FIGS. 5A and 5B, the first matching element 530 and the second matching element 550 are of trapezoidal protruded shape or tapered protruded shape, and the first alignment element 170 and the second alignment element 350 are of trapezoidal depressed shape. The protruded lengths of the first matching element 530 and the second matching element 550 are larger than the depressed depths of the first alignment 170 and the second alignment element 350. Therefore, the first matching, element 53.0 can be closely engaged with the first alignment element 170, and the second matching element 550 can be closely engaged with the second alignment element 350. In other words, the first matching element 530 is engaged with the first alignment element 17 in force fit manner (tight fit). The second matching element 550 is engaged with the second alignment element 350 in force fit manner. When the first matching element 530 is engaged with the first alignment element 170, as the protruded length of the first matching element 530 is larger than the depressed depth of the first alignment element, the optical transmitting portion 510 and the optical transmission port 150 are spaced for a distance, facilitating coupling the optical signal 700 to the optical transmitting portion 510 and the optical transmission port 150. Similarly, the protruded length of the second matching element 550 is larger than the depressed depth of the second alignment element 350, such that when the second matching element 550 is engaged with the second alignment element 350, the optical transmitting portion 510 and the port 330 are spaced for a distance, which also facilitates coupling the optical signal 700 to the optical transmitting portion 510 and the port 330. As shown in FIG. 6, when the first alignment element 170 and the second alignment element 350 are of the protruded shape, and the first matching element 530 and the second matching element 550 are of the depressed shape. The protruded lengths of the first alignment element 170 and the second alignment element 350 are respectively larger than the depressed depths of the first matching element 530 and the second matching element 550, such that when the first alignment element 170 is engaged with the first matching element 530, the optical transmitting portion 510 and the optical transmission port 150 are spaced for a distance. Similarly, when the second alignment element 350, is engaged with the second matching element 550, the optical transmitting portion 510 and the port 330 are spaced for a distance, such that the optical signal 700 can be respectively coupled to the optical transmission port 150 and the port 330 through the optical transmitting portion 510.

Figure 7:
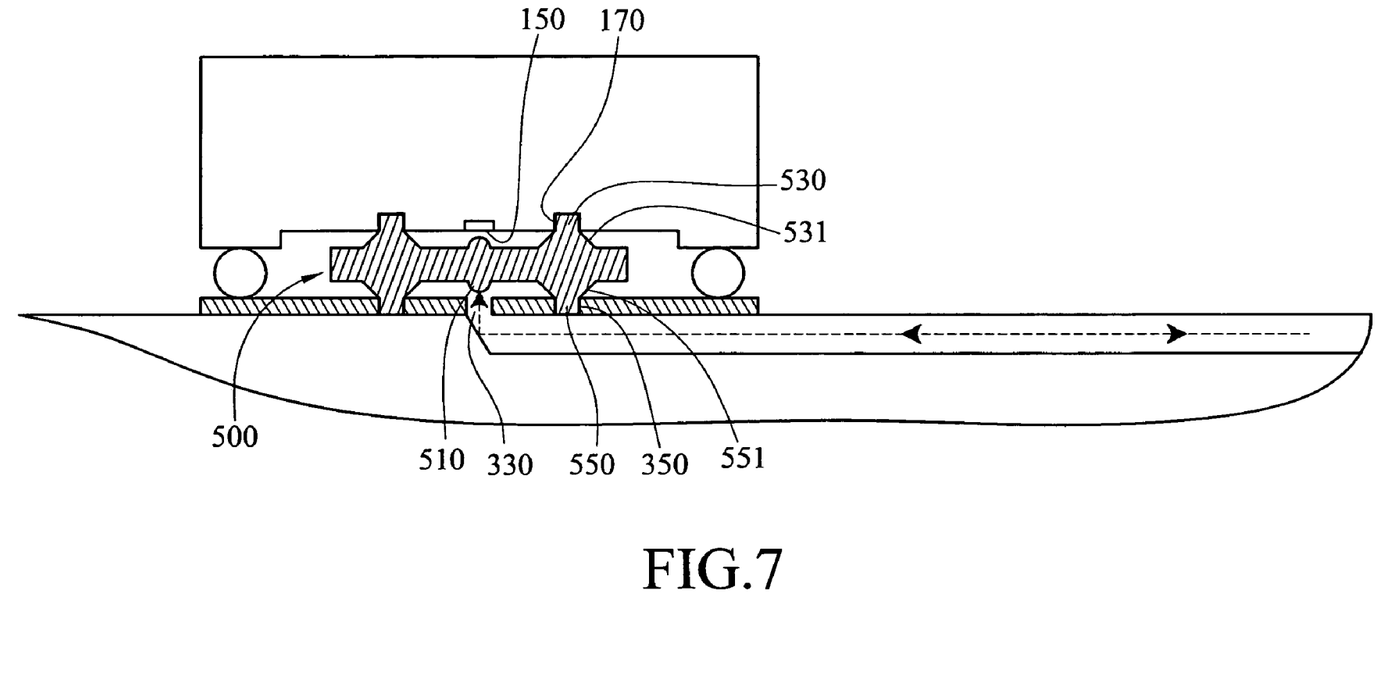
FIG. 7 is a schematic view of the first matching element and the second matching element with a sloped surrounding of the present invention.

Referring to FIG. 7, a schematic view of the first matching element and the second matching element with a sloped surrounding of the present invention is shown. As shown in FIG. 7, a slope 531 extends around the first matching element 530, so as to be against the first alignment element 170, and a slope 551 extends around the second matching element 550, so as to be against the second alignment element 350. In this manner, the optical transmitting portion 510 of the optical coupling element 500 can also be spaced from the optical transmission port 150 and the port 330 for a distance respectively.

Therefore, the optical interconnection module of the present invention can improve the optical coupling efficiency of the optical transmission port of the optoelectronic element and the port of the substrate by disposing the optical coupling element, and by the use of the optical coupling element, the optoelectronic element and the substrate can be directly aligned during assembly, thus saving an additional alignment process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical interconnection module, used to transmit an optical signal, comprising:
   at least one optoelectronic element, having an optical transmission port for transmitting the optical signal, and at least one first alignment element adjacent to the optical transmission port;
   a substrate, having an optical waveguide, at least one opening disposed on the surface of the substrate and connected to the optical waveguide, and at least one second alignment element adjacent to the port, wherein the optical signal is transmitted between the opening and the optical waveguide; and
   at least one optical coupling element, comprising an optical transmitting portion corresponding to the optical transmission port and the opening, at least one first matching element corresponding to the first alignment element, and at least one second matching element corresponding to the second alignment element, the first matching element and the second matching element being integrally formed from the two sides of the optical coupling element, wherein the first matching element is engaged with the first alignment element, the second matching element is engaged with the second alignment element, so as to make the optical signal transmitted among the optical transmission port, the optical transmitting portion, the opening, and the optical waveguide, and the optical transmitting portion is a double-convex lens, protruded from the two sides of the optical coupling element to form a lens shape.

2. The optical interconnection module as claimed in claim 1, wherein the first matching element is of a protruded shape, and the first alignment element is of a depressed shape, so as to make the first matching element engaged with the first alignment element.

3. The optical interconnection module as claimed in claim 2, wherein the protruded length of the first matching element is larger than the depressed depth of the first alignment element, such that when the first matching element is engaged with the first alignment element, the transmitting portion and the optical transmission port are spaced for a distance.

4. The optical interconnection module as claimed in claim 1, wherein the first matching element is of a depressed shape, and the first alignment element is of a protruded shape, so as to make the first alignment element engaged with the first matching element.

5. The optical interconnection module as claimed in claim 4, wherein the protruded length of the first alignment element is larger than the depressed depth of the first matching element, such that when the first alignment element is engaged with the first matching element, the transmitting portion and the optical transmission port are spaced for a distance.

6. The optical interconnection module as claimed in claim 1, wherein the second matching element is of a protruded shape, and the second alignment element is of a depressed shape, so as to make the second matching element engaged with the second alignment element.

7. The optical interconnection module as claimed in claim 6, wherein the protruded length of the second matching element is larger than the depressed depth of the second alignment element, such that when the second matching element is engaged with the second alignment element, the transmitting portion and the opening are spaced for a distance.

8. The optical interconnection module as claimed in claim 1, wherein the second matching element is of a depressed shape, and the second alignment element is of a protruded shape, so as to make the second alignment element engaged with the second matching element.

9. The optical interconnection module as claimed in claim 8, wherein the protruded length of the second alignment element is larger than the depressed depth of the second matching element, such that when the second alignment element is engaged with the second matching element, the transmitting portion and the opening are spaced for a distance.

10. The optical interconnection module as claimed in claim 1, wherein the shape of the first matching element accords with the shape of the first alignment element and is force-fitted the shape of the first alignment element.

11. The optical interconnection module as claimed in claim 10, wherein a slope extends around the first matching element, so as to be against the first alignment element.

12. The optical interconnection module as claimed in claim 1, wherein the shape of the second matching element accords with the shape of the second alignment element and is force-fitted the shape of the second alignment element.

13. The optical interconnection module as claimed in claim 12, wherein a slope extends around the second matching element, so as to be against the second alignment element.

14. The optical interconnection module as claimed in claim 1, wherein the optoelectronic element is electrically connected to the substrate through ball grid array soldering or Pin Grid Array.

15. The optical interconnection module as claimed in claim 1, wherein the position of the first matching element is corresponding to the position of the second matching element.

16. The optical interconnection module as claimed in claim 1, wherein the positions of the first matching element and the second matching element are staggered.

17. The optical interconnection module as claimed in claim 1, wherein the optical signal passes through double-convex lens.

* * * * *